United States Patent [19]

Brunnmueller et al.

[11] Patent Number: 4,623,699
[45] Date of Patent: Nov. 18, 1986

[54] PREPARATION OF LINEAR, BASIC POLYMER POWDERS

[75] Inventors: Fritz Brunnmueller, Limburgerhof; Michael Kröner, Mannheim; Heinrich Hartmann, Limburgerhof; Friedrich Linhart, Heidelberg; Klaus Pfitzner, Ludwigshafen, all of Fed. Rep. of Germany

[73] Assignee: BASF Aktiengesellschaft, Rheinland-Pfalz, Fed. Rep. of Germany

[21] Appl. No.: 802,060

[22] Filed: Nov. 25, 1985

[30] Foreign Application Priority Data

Nov. 29, 1984 [DE] Fed. Rep. of Germany ....... 3443461

[51] Int. Cl.$^4$ ............................................. C08F 8/00
[52] U.S. Cl. .................................. 525/355; 525/328.2
[58] Field of Search ......................................... 525/355

[56] References Cited

U.S. PATENT DOCUMENTS 4,238,579 12/1980 Leonard, Jr. et al. ............... 525/355
4,444,667 4/1984 Burkert et al. ....................... 525/383
4,499,232 2/1985 Engelhardt et al. ................. 524/548

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

Linear, basic polymer powders which contain units of the formula

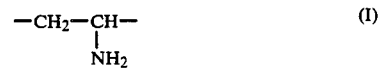

and have a Fikentscher K value of from 10 to 200 are prepared by eliminating the formyl groups from N-vinylformamide polymer powders with a gaseous hydrogen halide in the presence of not more than 5% by weight, based on the polymer used, of water.

10 Claims, No Drawings

PREPARATION OF LINEAR, BASIC POLYMER POWDERS

European Patent Application No. 71,050 discloses Linear, basic polymers which contain from 90 to 10 mol % of units of the formula

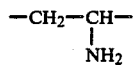

and from 10 to 90 mol % of units of the formula

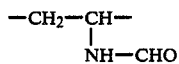

and have a Fikentscher K value of from 10 to 200 (measured in 0.5% strength aqueous sodium chloride solution at 25° C. ). These polymers are prepared by first polymerizing N-vinylformamide in the presence of a free radical polymerization initiator to give a polyvinylformamide, and then subjecting the resulting polymer to solvolysis in water, an alcohol, ammonia, an amine or a mixture of the stated solvents, at from 20° to 200° C., in the presence of an acid or base, with elimination of from 10 to 90% of the formyl groups from the N-vinylformamide homopolymer. The formyl groups are preferably eliminated in aqueous solution, using sodium hydroxide solution or hydrochloric acid. If an attempt is made to partially hydrolyze with aqueous hydrochloric acid N-vinylformamide polymers prepared by the method of reverse suspension polymerization and present in powder form, the products obtained are useless since the particles stick together to form a solid mass under the conditions of the hydrolysis.

It is an object of the present invention to provide a process for the preparation of linear, basic polymer powders which contain copolymerized vinylamine units.

We have found that this object is achieved, in accordance with the invention, by a process for the preparation of linear, basic polymerized powders which contain units of the formula

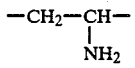

and have a Fikentscher K value of from 10 to 250 (measured at a polymer concentration of 0.5% by weight in 5% strength aqueous sodium chloride solution at 25° C.) by eliminating the formyl group from the N-vinylformamide ($CH_2=CH-NH-CHO$) polymers in the presence of an acid at up to 200° C. if the N-vinylformamide polymer powder is reacted with a gaseous hydrogen halide in the presence of not more than 5% by weight of water.

In this process, an N-vinylformamide polymer powder is used as the starting material and is reacted with a gaseous hydrogen halide, preferably in the presence of not more than 2.5% by weight, based on the polymer, of water or in the absence of water. Preferred hydrogen halides are hydrogen chloride and hydrogen bromide. A hydrogen halide in the anhydrous state is brought into contact with the solid product, carbon monoxide being eliminated under these reaction conditions. The reaction takes place via decarbonylation if it is carried out in the absence of water or in the presence of not more than 2.5% by weight of water. In order to achieve such a low water content in the polymers, the N-vinylformamide polymers which are prepared by the reverse suspension polymerization method must first be dried. Drying of the polymer beads obtained in the reverse suspension polymerization method is a prior art procedure and is preferably achieved by means of azeotropic distillation. The reverse suspension polymerization method gives, in particular, very high molecular weight polymers having a K value as high as 250. If only solution polymers which were described in, for example, the examples of European Patent No. 71,050 are available for the solvolysis, the water must first be removed and the polymer material comminuted to the desired particle size. It is also possible to start from polymers which are obtained by precipitation polymerization of N-vinylformamide in an alcohol, such as ethanol, isopropanol or tert.-butanol. The alcohols act as a regulator and give polymers which have a low molecular weight, for example a molecular weight corresponding to a K value of 20. Preferably, the starting material used is a poly-N-vinylformamide powder obtained by precipitation polymerization or reverse suspension polymerization. The products prepared by reverse suspension polymerization have to be dried, for example by azeotropic dehydration, whereas drying can be dispensed with in the case of the N-vinylformamide polymers produced by precipitation polymerization, provided that polymerization has been effected in the absence of water.

Elimination of the formyl group from poly-N-vinylformamide is preferably carried out in an inert suspending agent which does not dissolve the polymer particles. Examples of such solvents are ethers, such as dioxane, tetrahydrofuran or diethyl ether, and aliphatic and aromatic hydrocarbons, such as pentane, cyclohexane, heptane, octane, isooctane, dodecane, toluene and xylene.

Elimination of the formyl group may also be effected in a $C_1$–$C_8$-alcohol, the polymer being solvolyzed and the formate associated with the particular alcohol being formed in the reaction with the formyl groups of the polymer. Examples of $C_1$–$C_8$-alcohols are methanol, ethanol, n-propanol, isopropanol, n-butanol, isobutanol, tert.-butanol and 2-ethylhexanol. $C_1$–$C_4$-alcohols are preferably used.

The alcoholysis may also be carried out in the presence of one of the abovementioned inert suspending agents.

The particle size of the N-vinylformamide polymer is from 10 to 1000 μm, preferably from 50 to 400 μm. Elimination of the formyl group from the polymers can be effected in, for example, a powder bed in which a hydrogen halide is allowed to act on an N-vinylformamide polymer powder and care is taken to ensure thorough mixing of the powder. This can be done, for example, in a stirred kettle or a fluidized bed. The carbon monoxide eliminated is removed from the exit gas while the excess hydrogen halide is recycled to the powder bed.

Dioxane, tetrahydrofuran or cyclohexane is preferably used as the solvent. The polymer particles are suspended therein, and exposed to the action of the hydrogen halide, preferably hydrogen chloride, at from 20° to 200° C., preferably from 35° to 105° C. About 0.05–10, preferably 0.1–1.5, equivalents of an anhydrous hydrogen halide are required per equivalent of formyl groups in the poly-N-vinylformamide (1 equivalent is understood as being 1 gram equivalent). Depending on the concentration of the hydrogen halide and on the temperature, partial or complete elimination of formyl groups from the N-vinylformamide polymer powder is obtained. In the case of partial elimination of formyl groups, the resulting polymers contain units of the formula

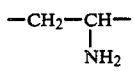  (I)

and units of the formula

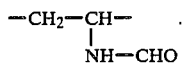  (II)

Preferably, the elimination is carried out so that the resulting polymer contains from 90 to 10 mol % of units of the formula (I) and from 10 to 90 mol % of units of the formula (II). Polymers of this type, as well as polyvinylamine, are useful, for example, as flocculents for waste waters and sludges and as retention agents, drainage aids and flocculents in papermaking.

If the elimination of the formyl groups is carried out in the presence of a solvent and the reaction temperature is above the boiling point of the solvent, the reaction is effected in an autoclave. If the elimination of the formyl groups from poly-N-vinylformamide is carried out in the presence of a small amount of water or alcohol, formic acid or a formate is obtained instead of carbon monoxide. The K value of the polymers containing vinylamine units is roughly the same as the K value of the N-vinylformamide polymers. The K value of the polymers was measured by the method due to H. Fikentscher, Cellulosechemie 13 (1932), 58–64 and 71–74, at a polymer concentration of 0.5% by weight in 5% strength aqueous sodium chloride solution at 25° C.; $K = k \cdot 10^3$.

EXAMPLE 1

In three different batches, 7.1 g (100 millimoles) of an anhydrous poly-N-vinylformamide powder are gassed with dry hydrogen chloride, while stirring. The exit gas is passed through a sodium hydroxide wash and the amount of carbon monoxide is then determined volumetrically. The reaction conditions and the degree of hydrolysis and yield of the polymer are shown in Table 1. The particle diameters of the starting materials are shown in Table 2.

TABLE 1

| Example | K value | HCl/h mH/h | Temperature (°C.) | Reaction time (h) | Degree of hydrolysis (%) | CO (% of theory) | Yield (g) |
|---|---|---|---|---|---|---|---|
| a | 29.3 | 72 | 115 | 7 | 50 | 100 | 7.5 |
| b | 87 | 82 | 115 | 6.5 | 62 | 87 | 7.6 |
| c | 122 | 112 | 110 | 4 | 34 | 100 | 7.4 |

TABLE 2

| Example 1 | >160 μm | 160–100 μm | 100–60 μm | >60 μm |
|---|---|---|---|---|
| a | 16.6% | 44% | 22.5% | 17% |
| b | 5.6% | 3% | 8.4% | 83% |
|   | >300 μm | 300–200 μm | 200–100 μm | >100 μm |
| c | 6.7% | 39% | 51.6% | 2.8% |

EXAMPLE 2

17.8 g (250 millimoles) of a poly-N-vinylformamide powder having a K value of 30.8 and a mean particle diameter of from 100 to 300 μm are suspended in 82.2 g of dioxane, and the suspension is gassed with 9.1 g (250 millimoles) of dry hydrogen chloride and then heated for 2 hours at 90° C., while stirring. The water content of the polymer is 1% by weight, based on the polymer used. After cooling, the product is filtered off and the adhering suspending agent (dioxane) is removed under reduced pressure to give 17.0 g of a poly-N-vinylformamide from which 12% of the formyl groups have been eliminated.

EXAMPLE 3

100 g (1.406 moles) of poly-N-vinylformamide powder having a particle diameter of from 100 to 300 μm are suspended in each case in the alcohol stated in Table 3 and subjected to solvolysis under the conditions likewise stated in Table 3. The water content is 1.5% by weight, based on the polymer.

TABLE 3

| Example 3 | K value | Alcohol Type | Alcohol Amount | HCl (moles) | Reaction temp. (°C.) | Reaction time (h) | Degree of hydrolysis (%) | Yield (g) |
|---|---|---|---|---|---|---|---|---|
| a | 140 | methanol | 513 | 1.406 | 40 | 14 | 44 | 105.1 |
| b | 29.3 | isopropanol | 910 | 3.173 | 84 | 3 | 28 | 103.2 |
| c | 93.4 | isobutanol | 385 | 1.058 | 100 | 6 | 56 | 105 |
| d | 93.4 | isobutanol | 373 | 0.702 | 80 | 3.3 | 26 | 102.5 |

EXAMPLE 4

113.6 g (1.566 moles) of poly-N-vinylformamide powder having a particle size of from 100 to 200 μm and a K value of 28 are initially taken in an autoclave. The water content of the polymer is 2.1% by weight. 71 g (0.96 mole) of isobutanol and 355 g of cyclohexane are then added, the autoclave is closed, 37.6 g (1.03 moles) of gaseous hydrogen chloride are injected at room temperature, and the contents of the autoclave are heated at 100° C. for 4 hours, the resulting pressure being not more than 1.7 bar. After cooling, the powder is separated off from the suspending agent and is washed, and the adhering suspending agent is removed under reduced pressure. 113 g of a polymer having a degree of hydrolysis of 71% are obtained.

EXAMPLE 5

As described in Example 4, 7.1 g (0.1 mole) of a mixture of 2.6 g of a poly-N-vinylformamide powder having a mean diameter of from 200 to 300 μm and 4.5 g of the same polymer having a mean diameter of from 100 to 200 μm in 355 g of dry cyclohexane are initially taken in an autoclave, together with 3.7 g (50 millimoles) of isobutanol and 3.65 g (0.1 mole) of hydrogen chloride, and the contents of the autoclave are heated at 100° C. for 4 hours. The K value of the polymer is 142.5. 7.65 g of a poly-N-vinylformamide powder from which some of the formyl groups have been eliminated are obtained. As shown in Table 4, the degree of hydrolysis is substantially independent of the particle size of the polymer.

TABLE 4

(a) 0.46 g having a particle size >250 μm: degree of hydrolysis=37%
(b) 6.65 g having a particle size of 125 -250 μm: degree of hydrolysis=44%
(c) 0.54 g having a particle size <125 μm: degree of hydrolysis=42%.

We claim:

1. A process for the preparation of a linear, basic polymer powder which contains units of the formula

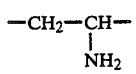

$$-CH_2-CH- \atop | \atop NH_2 \qquad (I)$$

and has a Fikentscher K value of from 10 to 250 (measured at a polymer concentration of 0.5% by weight in 5% strength aqueous sodium chloride solution at 25° C., wherein the formyl groups are eliminated from an N-vinylformamide polymer powder which contains no more than 5% by weight of water by reaction with a gaseous hydrogen halide at up to 200° C., with formation of units of the formula I.

2. A process as claimed in claim 1, wherein the reaction is carried out using gaseous hydrogen chloride or hydrogen bromide in the presence of not more than 2.5% by weight of water.

3. A process as claimed in claim 1, wherein the reaction is carried out in the absence of water.

4. A process as claimed in claim 1, wherein the reaction is carried out in the presence of an inert suspending agent which does not dissolve the polymer particles.

5. A process as claimed in claim 4, wherein the suspending agent used is dioxane, tetrahydrofuran or cyclohexane.

6. A process as claimed in claim 1, wherein elimination of the formyl groups is carried out in a $C_1$-$C_8$-alcohol.

7. A process as claimed in claim 6, wherein an inert suspending agent is used in addition.

8. A process as claimed in claim 1, wherein the particle size of the N-vinylformamide polymer is from 10 to 1000 μm.

9. A process as claimed in claim 1, wherein the particle size of the N-vinylformamide polymer is from 50 to 400 μm.

10. A process as claimed in claim 1, wherein the reaction is carried out at from 35° to 150° C.

* * * * *